United States Patent [19]
Griffin et al.

[11] Patent Number: 5,395,004
[45] Date of Patent: Mar. 7, 1995

[54] QUICK-ON FUEL CAP

[75] Inventors: Jeffrey Griffin, Rte. 6, Box 414A, Connersville, Ind. 47331; Robert S. Harris, Connersville, Ind.

[73] Assignee: Jeffrey Griffin, Connersville, Ind.

[21] Appl. No.: 948,096

[22] Filed: Sep. 21, 1992

[51] Int. Cl.6 ............................................. B65D 41/06
[52] U.S. Cl. .................................. 220/295; 220/293; 220/300; 220/DIG. 33
[58] Field of Search ............... 220/293, 295, 303, 304, 220/DIG. 33, 300

[56] References Cited

U.S. PATENT DOCUMENTS

| | | | |
|---|---|---|---|
| 3,006,499 | 10/1961 | Corbett | 220/293 |
| 3,820,680 | 6/1974 | Friend . | |
| 3,913,783 | 10/1975 | Cooper | 220/300 |
| 4,245,751 | 1/1981 | Neiman | 220/204 |
| 4,294,375 | 10/1981 | Gerdes | 220/293 |
| 4,339,055 | 7/1982 | Hutzenlaub | 220/295 |
| 4,436,219 | 3/1984 | Reutter | 220/DIG. 33 X |
| 4,498,493 | 2/1985 | Harris . | |
| 4,887,733 | 12/1989 | Harris . | |

*Primary Examiner*—Allan N. Shoap
*Assistant Examiner*—Stephen Cronin
*Attorney, Agent, or Firm*—Barnes & Thornburg

[57] ABSTRACT

A quick-on cap (10) is provided for engaging a filler neck (22). The cap (10) includes a closure for closing the mouth of the filler neck (22) and a gripping mechanism for gripping the filler neck (22) to establish a fuel vapor seal between the closure and the filler neck (22). The closure includes a core (18) and a sleeve (14) that is movable relative to the core (18). The sleeve (14) carries a sealing ring (34) that is configured to seal against the filler neck (22). The gripping mechanism is coupled to the core (18) and sleeve (14) and grips the filler neck (22) to compress the sealing ring (34) between the sleeve (14) and the filler neck (22) in response to movement of the core (18) relative to the sleeve (14) in a cap-installation direction. The closure also includes a handle cover (12) coupled to the core (18) to make it easy for a user to move the core (18) relative to the sleeve (14) in the cap-installation direction an amount sufficient to actuate the gripping mechanism. The sleeve (14) is formed to include a passageway extending therethrough and containing the cylindrical core (18). The core (18) is rotated a fraction of a turn relative to the sleeve (14) to actuate the gripping mechanism.

51 Claims, 6 Drawing Sheets

QUICK-ON FUEL CAP

BACKGROUND AND SUMMARY OF THE INVENTION

The present invention relates to a cap for closing the mouth of a filler neck, and in particular to fuel caps for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Conventional fuel caps for closing the filler neck of a vehicle fuel tank typically include a closure member for closing the mouth of the filler neck and a handle for turning the closure member to mount the closure member in the filler neck. Partial turn cam-on caps and multiple turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733 to Harris. These cam lugs operate in the customary way to engage a filler neck configured to receive a cam-on cap and retain the cap in a fully tightened position closing the open mouth of the filler neck.

Alternatively, a conventional multiple turn cap includes a closure member that is threaded to be screwed into a threaded filler neck. For example, U.S. Pat. No. 3,820,680 to Friend discloses a multiple turn threaded cap and a compatible threaded filler neck. Typically, a multiple turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

According to the present invention, a quick-on cap is provided for engaging a filler neck. The cap includes means for closing the mouth of the filler neck and means for gripping the filler neck to establish a fuel vapor seal between the closing means and the filler neck. The closing means includes a core and a sleeve that is movable relative to the core. The sleeve carries a sealing ring that is configured to seal against the filler neck. The gripping means is coupled to the core and sleeve and grips the filler neck to compress the sealing ring between the sleeve and the filler neck in response to movement of the core relative to the sleeve in a cap-installation direction.

In preferred embodiments, the closing means further includes a handle cover coupled to the core to make it easy for a user to move the core relative to the sleeve in the cap-installation direction an amount sufficient to actuate the gripping means. Illustratively, the sleeve is a tubular member that is formed to include a passageway extending therethrough and containing the cylindrical core and the core is rotated a fraction of a turn relative to the sleeve to actuate the gripping means.

In use, the cap is inserted into the filler neck so that axially extending anti-rotation ribs provided on the exterior wall of the sleeve engage internal flanges or abutments provided in the filler neck to block rotation of the sleeve inside the filler neck during installation of the cap. A user then turns the exterior handle cover a small amount (e.g., one-eighth of a turn) to rotate the core inside the sleeve and cause a retaining lug appended to the core to slip into a slot and engage another internal flange or abutments provided in the filler neck. Removal of the cap from the filler neck is now blocked by engagement of the retaining lug and the internal flange. At the same time, a spring and cam mechanism coupled to the core and sleeve operate automatically to convert rotation of the handle cover and core into axial movement of the sleeve and urge the non-rotatable sleeve further in an axially inward direction into the filler neck. This axial movement of the sleeve into the filler neck advantageously causes the sealing ring carried on the sleeve to be compressed between the sleeve and the filler neck so that a fuel vapor seal is established between the closing means and the filler neck.

Thus, in preferred embodiments, the gripping means comprises means for engaging the filler neck disposed on the sleeve to prevent rotation of the sleeve in the filler neck and to permit axial movement of the sleeve in the filler neck, means for engaging the filler neck to prevent axial outward movement of the cap from the filler neck when the core is rotated in the cap-installation direction, spring means for yieldably urging the sleeve axially inwardly in response to rotational movement of the core in the cap-installation direction, and control means for releasing the spring means in response to such movement in the cap-installation direction and for loading said spring means in response to rotational movement in the opposite direction.

In accordance with the present invention, the preferred filler neck is provided with a gripping portion disposed axially inwardly from the mouth of the filler neck and located inside the filler neck. This gripping portion may include radially inwardly extending abutments or flanges to be engaged by engaging means carried, respectively, on the sleeve and the core.

Illustratively, the core may be a tubular member containing a pressure-relief valve and a vacuum-relief valve. The pressure-relief valve operates to vent excess fuel vapor pressure in the filler neck to the atmosphere when the cap is installed on the filler neck. The vacuum-relief valve operates to introduce air from the atmosphere into the filler neck whenever the cap is in place on the filler neck and the pressure in the filler neck falls a predetermined amount below atmospheric pressure. The sleeve surrounds the tubular member and is coaxially aligned with the longitudinal axis of rotation of the tubular member. A second sealing ring is provided around the tubular member and inside the sleeve to establish a fuel vapor seal between the core and the sleeve yet allow rotation of the core relative to the sleeve during installation and removal of the filler neck cap.

In a preferred embodiment, the spring and cam mechanism that is responsible for establishing the fuel vapor seal between the closing means and the filler neck includes a cam on the core, a cam follower on the sleeve, and a spring acting against the core and the sleeve to urge the cam follower into engagement with the cam. Illustratively, the spring is a cylindrical compression spring that is arranged around the tubular core and positioned to lie in the cylindrical space between the exterior of the tubular core and the interior of the surrounding cylindrical sleeve.

The spring urges the core and sleeve in opposite directions. Thus, the spring tends to urge the core in an axially outward direction to wedge the retaining lug on the core against the internal flange on the filler neck so that the core is effectively anchored to the filler neck. Also, the spring tends to push against the anchored core to urge the sleeve in an axially inward direction to compress the sealing ring carried by the sleeve between the sleeve and the filler neck.

The importance of the cam mechanism as a control means is that it acts to hold the spring in a compressed position until after the cap is inserted into the filler neck to engage the sleeve ribs and certain internal flanges in the filler neck so that the sleeve is unable to rotate within the filler neck and the handle cover is moved (e.g., rotated one-eighth of a turn) relative to the filler neck so that the core is rotated relative to the sleeve. During such movement of the core relative to the sleeve, the cam mechanism operates to "release" the spring so that it can expand and move the non-rotatable sleeve further in the axially inward direction into the filler neck. Thus, the spring urges the sleeve inwardly to compress the sealing ring between the sleeve and the filler neck so that a fuel vapor seal is established between the closing means and the filler neck. Conversely, the control means or cam mechanism preferably serves to load the spring when the core is rotated relative to the sleeve in a cap-removal direction.

During installation and removal of the quick-on filler neck cap, it is only necessary for the user to move the handle cover of the cap a small amount relative to the filler neck to tighten or loosen the cap during refueling. The spring acting on the cam follower and cam also urges the gripping means toward the fully installed position resulting in a predetermined amount of self-actuation in the installation direction. Advantageously, the gripping means included in the quick-on filler neck cap acts automatically using the spring and cam mechanism to establish a tight fuel vapor seal between the cap and filler neck during cap installation and minimize the chances that such a seal will not be established as a result of improper installation of the cap. Also, users will appreciate the fact that it is simpler to install and remove the quick-on filler neck cap than conventional partial turn cam-on and multiple turn threaded caps. An additional advantage is that the sealing ring between the cap and the filler neck is less likely to be scuffed during installation of the cap on the filler neck because it is moved axially against the filler neck instead of being rotated into engagement with the filler neck.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWING

Figure 1:
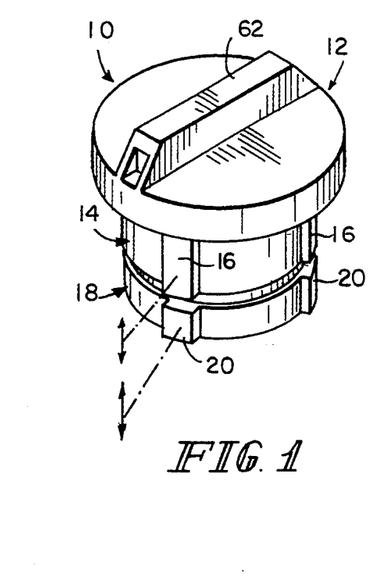
FIG. 1 is a perspective view of a quick-on cap according to the present invention showing the configuration of the cap before it is installed in a filler neck and showing retaining lugs on the core aligned with and underneath the exterior anti-rotation ribs on the sleeve to permit insertion of the quick-on cap into the filler neck.

A quick-on cap 10 in accordance with the present invention is shown in FIG. 1 as it would appear to a user about to insert cap 10 into a filler neck. Cap 10 includes a handle cover 12, a sleeve 14 having three radially outwardly projecting, axially extending, and circumferentially spaced-apart ribs 16, and a core 18 having three radially outwardly projecting and circumferentially spaced-apart retaining lugs 20. Initially, as shown in FIG. 1, the ribs 16 are axially aligned with the retaining lugs 20 to permit a user to insert the cap 10 into the filler neck 22 shown diagrammatically in FIG. 2. This filler neck 22 is formed to include three circumferentially spaced-apart, axially extending slots (not shown in FIG. 2—see, for example, FIG. 8) for receiving the three aligned pairs of ribs 16 and retaining lugs 20 during insertion of cap 10 into filler neck 22.

It will be appreciated that the axially extending slots in the filler neck for receiving the three aligned pairs of ribs 16 and retaining lugs 20 during insertion of cap 10 into the filler neck constitute a gripping portion of the filler neck disposed axially inwardly from the mouth internally in the neck. This gripping portion internally in the filler neck may take any number of forms within the scope of the present invention including radially-inwardly extending abutments or flanges. The ribs 16 constitute means for engaging such filler neck abutments or flanges to prevent rotation of the sleeve in the filler neck. Similarly, the spaced-apart retaining lugs 20 on the core 18 may constitute means for engaging such filler neck abutments or flanges to prevent axial outward movement of the cap from the filler neck. It will be appreciated that such engaging means, i.e., corresponding to the retaining lugs 20, may take any number of forms to cooperate with such abutments or flanges in the filler neck.

Essentially, therefore, the quick-on cap 10 of the present invention comprises means for engaging the sleeve 14 to the filler neck 22 to permit axial insertion and axial movement of the sleeve 14 in the filler neck 22 but not rotation of the sleeve 14 within the filler neck 22 as well as means for engaging the core 18 with the filler neck 22 once the core 18 is rotated in a cap-installation direction relative to the sleeve 14 to prevent axial outward movement of the cap 10 from the filler neck 22.

Figure 2:
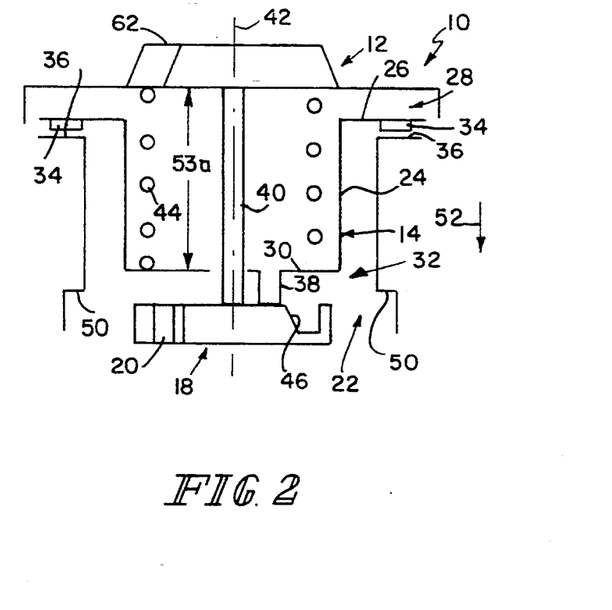
FIG. 2 is a diagrammatic view of the cap of FIG. 1 after it is inserted into a filler neck showing an uncompressed sealing ring carried by a top flange of the sleeve and a spring urging the cam follower on the sleeve into engagement with the cam on the core.
Figure 4:
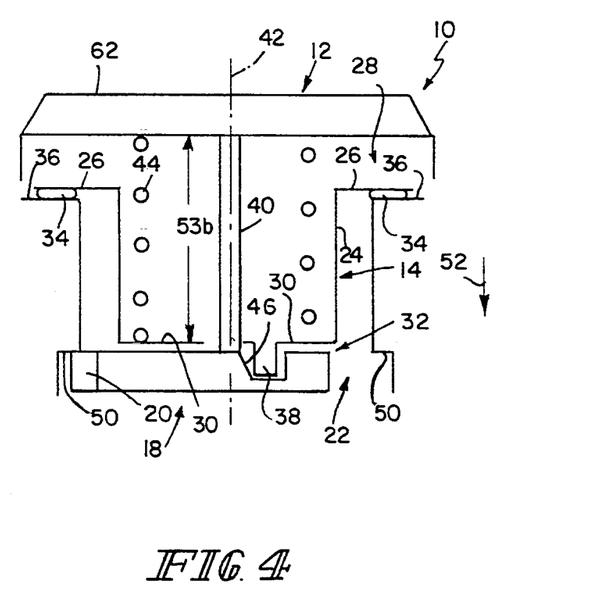
FIG. 4 is a diagrammatic view of the cap of FIG. 3 in place in a filler neck showing how the cam on the core rotated as the handle cover rotated to "release" the spring so that the spring functions to urge the sleeve further in an axially inward direction into the filler neck to compress the sealing ring carried by the sleeve between the sleeve and the filler neck and establish a fuel vapor seal therebetween.
Figure 9:
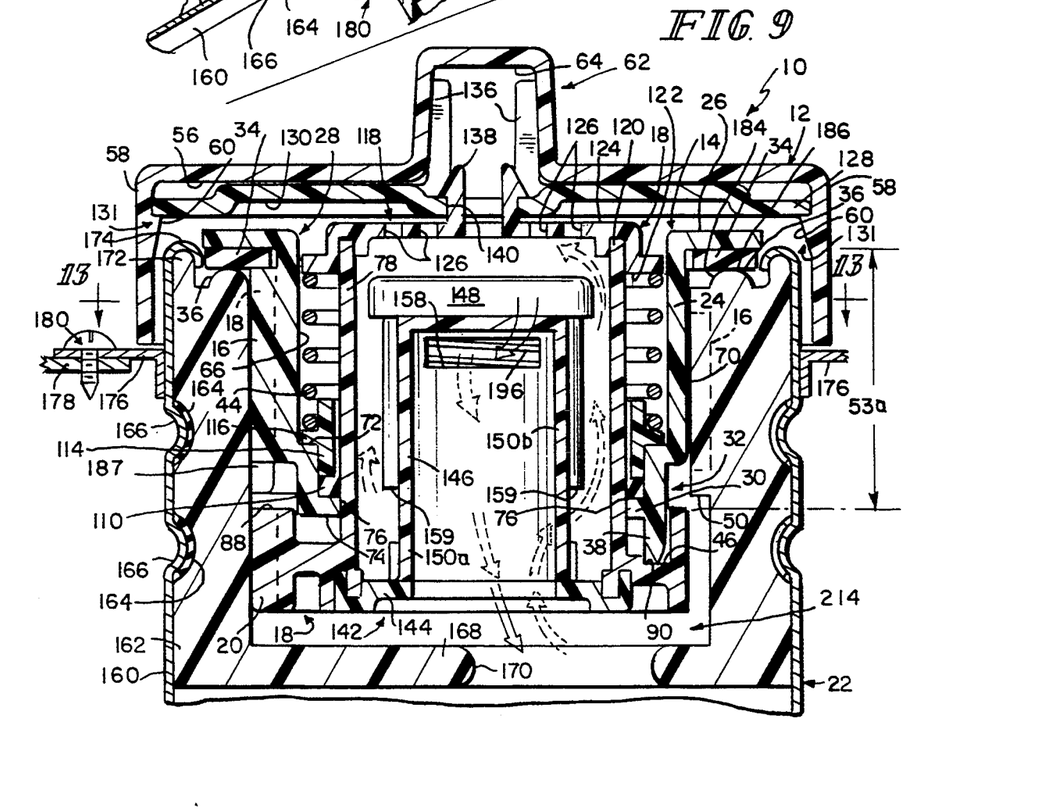
FIG. 9 is a section through the quick-on cap of FIG. 8 after the cap is inserted into the filler neck of FIG. 8 but before the handle cover and core are rotated relative to the filler neck.

As shown diagrammatically in FIGS. 2 and 4, the sleeve 14 includes a cylindrical body 24 including a radially outwardly extending annular top flange 26 at the outer end 28 and a radially inwardly extending annular bottom flange 30 at the inner end 32. An annular sealing ring 34 is carried in part by annular top flange 26 as shown in FIG. 9 so that it can be pressed as shown in FIG. 4 against an annular rim 36 at the outer edge of filler neck 22 to establish a fuel vapor seal therebetween during installation of cap 10 on filler neck 22. At least one cam follower 38 is appended to the annular bottom flange 30 of sleeve 14 to engage a portion of core 18.

As shown diagrammatically in FIGS. 2 and 4, core 18 is coupled to handle cover 12 by coupling means 40 so that the core 18 will rotate about its axis 42 in response to manual rotation of handle cover 12 about axis 42 during installation and removal of filler neck cap 10. A spring 44 is provided inside cap 10 for urging the sleeve 14 and core 18 in opposite directions so that each cam follower 38 on the inner end 32 of sleeve 14 is yieldably biased against an underlying cam 46 formed on core 18.

In use, quick-on cap 10 is easily installed on filler neck 20 to establish a fuel vapor seal between the cap 10 and filler neck 22 by taking the cap 10 shown in FIG. 1, inserting it axially into the filler neck 22 as shown diagrammatically in FIG. 2 to position the annular sealing ring 34 carried on the top flange 26 of sleeve 14 opposite to the annular rim 36 on filler neck 22, and then rotating the handle cover 12 one-eighth of a revolution about axis 42 in a clockwise or cap-installation direction 48. Such rotation of handle cover 12 rotates the core 18 relative to sleeve 14 to move retaining lugs 20 into engagement with internal flanges 50 formed in filler neck 22 to "anchor" the core 18 in the filler neck 22. Ribs 16 on sleeve 14 function as anti-rotation ribs because they engage other internal flanges (shown in FIG. 8) in filler neck 22 to block rotation of sleeve 14 relative to filler neck 22 during rotation of handle cover 12 and core 18 relative to filler neck 22.

At the same time, rotation of handle cover 12 rotates the core 18 about axis 42 rotate the cam 46 relative to the spring-loaded cam follower 38 and "control" expansion of the spring 44 so that spring 44 is "released" to move the sleeve 14 from the position shown in FIG. 2 further into the filler neck 22 in axially inward direction 52 to the position shown in FIG. 4. The distance 53b between the handle cover 12 and the annular bottom flange 30 of sleeve 14 in FIG. 4 is greater than the distance 53a shown in FIG. 2 because the compression spring 44 has been released or unloaded by the camming means and allowed to expand. This inward movement of the sleeve 14 causes the annular top flange 26 on sleeve 14 to move in inward direction 52 toward the annular rim 36 on filler neck 22 to compress the annular sealing ring 34 tightly between cap 10 and filler neck 22 and establish a fuel vapor seal. In effect, the sleeve 14 and core 18 cooperate to grip the filler neck 22 so that the sealing ring 34 is compressed between the sleeve 14 and the filler neck 22 in response to movement of the core 18 relative to the sleeve in a cap-installation direction.

Cap 10 is easily removed from filler neck 22 during refueling by first twisting it one-eighth of a revolution in counterclockwise or cap-removal direction 54 to align the retaining lugs 20 on the core 18 axially with the anti-rotation ribs 16 on the sleeve 14 as shown in FIG. 1. This rotation is sufficient to move the cap 10 relative to the filler neck 22 from its tightened position shown in FIG. 4 to a loosened position shown in FIG. 2. This cap-removal rotation also loads the spring.

The cap 10 is now in a position where it can be withdrawn easily from the mouth of filler neck 22. Conveniently, the withdrawn cap 10 has the configuration shown in FIG. 1 and thus, with the spring loaded, it is ready to be installed in filler neck 22 at the end of the refueling process.

Figure 3:
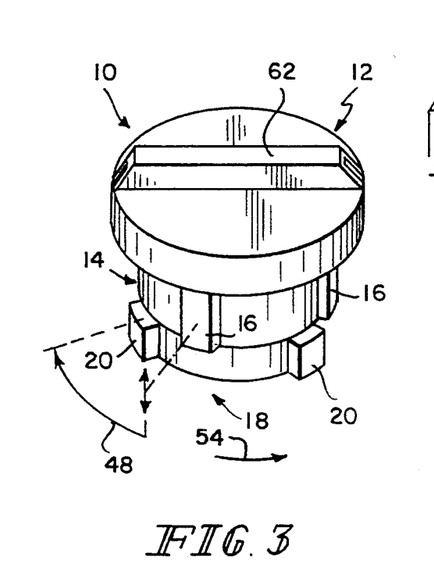
FIG. 3 is a perspective view of the cap of FIG. 1 as it would appear in the filler neck after the handle cover has been rotated one-eighth of a turn relative to the sleeve and filler neck to rotate the retaining lugs on the core into engagement with internal flanges in the filler neck to anchor the core in the filler neck.
Figures 5, 6, 7:
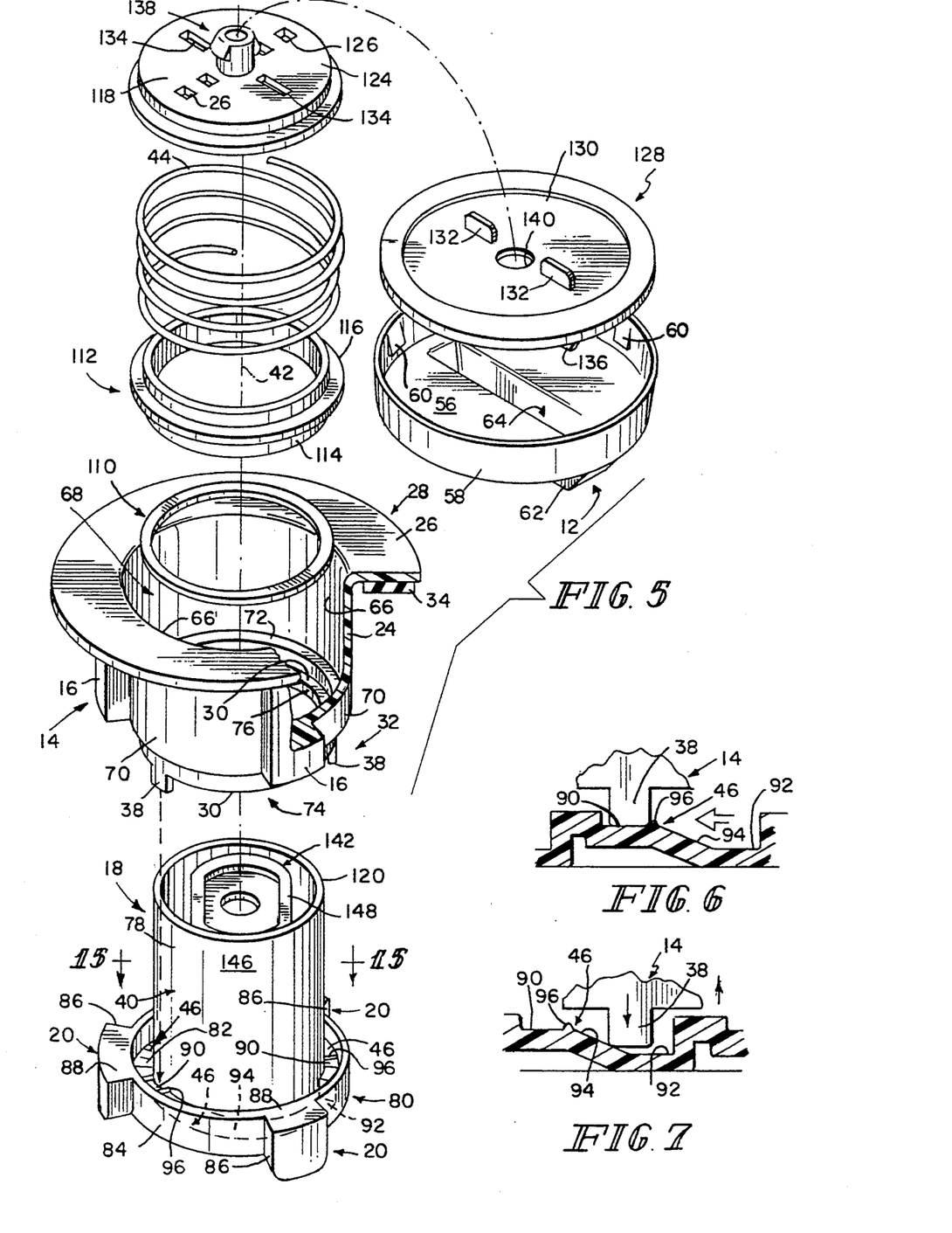
FIG. 5 is an exploded perspective view of a preferred embodiment of the quick-on cap of FIG. 1 showing the handle cover, the spring, the sleeve carrying the sealing ring and including downwardly extending cam followers, and the core including a tubular member, radially outwardly extending and circumferentially spaced retaining lugs, and three cylindrical cams arranged in a circle around the tubular member to engage three overlying cam followers on the sleeve.
FIG. 6 shows a flat development of one of the downwardly extending cam followers on the sleeve resting on a top portion of one of the cams provided on the core in the condition shown in FIG. 2.
FIG. 7 is a view similar to FIG. 6 showing the spring-loaded cam follower as it is cammed toward the position shown in FIG. 4 during rotation of the handle cover and core one-eighth of a turn relative to the sleeve and filler neck.

An exploded perspective view of the quick-on cap 10 of FIGS. 1 and 3 is provided in FIG. 5 to illustrate a preferred embodiment of the various components in the cap 10. Handle cover 12 includes a circular top wall 56, annular perimeter side wall 58, a plurality of radially inwardly projecting lugs 60, and a hollow grip handle 62 formed to include an elongated axially inwardly opening channel 64 extending across the diameter of the circular top wall 56. The handle cover 12 is used in the manner described below to rotate the core 18 inside sleeve 14 because of a coupling between handle cover 12 and core 18.

Sleeve 14 is preferably formed as illustrated in FIG. 5 so that the axially extending cylindrical body 24 includes an annular interior side wall 66 defining a cylindrical inner chamber 68 for receiving an assembly including spring 44 therein. The cylindrical body 24 also includes an annular exterior side wall 70 and the three anti-rotation ribs 16 are formed to lie in spaced-apart relation to one another about the circumference of exterior side wall 70. As best shown in FIG. 9, the cylindrical body 24 is formed to include a radially inwardly projecting middle annular flange 72 which is located along the annular interior side wall 66 between the previously described bottom flange 30 and top flange 26 on sleeve 14. As also shown in FIG. 9, the inner end 32 of sleeve 14 extends downwardly from the annular middle flange 72. The three cam followers 38 on sleeve 14 are appended to the annular bottom edge 74 of inner end 32 and are arranged to extend in an axially inner direction to engage the three cylindrical cams 46 formed in core 18. A concentric core-receiving aperture 76 is formed in the bottom of sleeve 14 as shown in FIGS. 5 and 9. The portion of core 18 including cams 46 and retaining lugs 20 constitutes a gripping portion and the portion of sleeve 14 including cam followers 38 constitutes a grip-actuating portion.

Core 18 is preferably formed as illustrated in FIG. 5 to include an axially extending tubular body or cylindrical member 78 that is sized to fit through the core-receiving aperture formed in the inner end 32 of sleeve 14 and extend into the cylindrical inner chamber 68 formed in sleeve 14. The core 18 also includes a ring 80 appended to a lower end of the tubular body 78 by an annular web 82. The three retaining lugs 20 are appended to an exterior wall 84 of ring 80 and arranged to lie in spaced-apart relation around the circumference of exterior wall 84. Each retaining lug 20 includes a stop face 86 for engaging an internal flange in the filler neck 22 to limit rotation of core 18 in filler neck 22 and an anchor face 88 for engaging another internal flange in the filler neck 22 to block withdrawal of the core 18 from the filler neck 22.

Three cylindrical cams 46 are formed in the annular web 82 and presented upwardly to be engaged by the three downwardly extending cam followers 38 appended to sleeve 14 as shown best in FIGS. 5–7 and 15. A flat development of each cylindrical cam 46 is shown in FIGS. 6 and 7. The cam angles are selected to assist rotation of the core 18 in the cap-installation direction. Each cam 46 includes a top platform 90 for supporting the spring-loaded cam follower 38 in an axially higher position shown in FIG. 6 corresponding to a "loosened condition" of cap 10 as shown diagrammatically in FIG. 2 and in more detail in FIG. 9. Each cam 46 also includes a bottom platform 92 for supporting the spring-loaded cam follower 38 in an axially lower position corresponding to a "tightened condition" of cap 10 as shown diagrammatically in FIG. 4 and in greater detail in FIG. 10.

A downwardly sloping cylindrical or helical ramp 94 connects the top and bottom platform 90, 92 of each cam 46 to guide the spring-loaded cam followers 38 between the top and bottom platforms 90, 92 in response to rotation of core 18 within filler neck 22 and relative to the non-rotatable sleeve 14. Also, a radially extending extending, axially upwardly projecting detent 96 is provided between each top platform 90 and ramp 94 as shown in FIGS. 5–7 to inhibit movement of the spring-loaded cam followers 38 off top platforms 90 and onto ramps 94 until enough torque is applied by a user to handle cover 12 to twist or rotate core 18 in the filler neck 22. In practice, the detents 96 advantageously prevent rotation of core 18 relative to sleeve 14 when the quick-on cap 10 is not installed on a filler neck.

The cam 46 and cam follower 38 arrangement just described constitute means for releasing the spring means 44 in response to rotational movement of the core in the cap-installation direction and for loading the spring means in response to rotational movement of the core in the opposite direction. The cam 46 on core 18 and the cam follower 38 on sleeve 14 thus cooperate to control movement of the annular sealing ring 34 on the sleeve into and out of sealing engagement with the sealing portion or seat 186 (see FIGS. 8 and 9) on filler neck 22.

As shown best in FIGS. 5 and 9, a second sealing ring 110, a squeeze collar 112, and the spring 44 cooperate to provide an assembly for establishing a fuel vapor seal between the sleeve 14 and the core 18 that remains in place even during axial and rotational movement of the core 18 relative to sleeve 14. Squeeze collar 112 fits around tubular body 78 and lies in the annular space between the interior side wall 66 of the sleeve 14 and the exterior side wall of the tubular body 78. Squeeze collar 112 includes a rim 114 for pushing the resilient second sealing ring 110 against the annular bottom flange 30 on sleeve 14 under a load provided by spring 44 so as to spread the sealing ring 110 in a radially inward direction against the tubular body 78 and in a radially outward direction against an interior side wall of the inner end 32 of sleeve 14 as shown, for example, in FIG. 9 and 10. Squeeze collar 112 also includes an outer annular flange 116 for engaging the annular middle flange 72 on the sleeve 14 to limit travel of squeeze collar 112 in an axially inward direction.

As shown in FIGS. 5 and 9, a top lid 118 is coupled to the axially outer end 120 of the tubular body 78 to provide an annular seat 122 for spring 44 and a cover 124 over the open end 120 of the tubular body 78. Several apertures 126 are formed in cover 124 to vent fuel vapors from the interior region inside tubular body 78 during pressurized conditions in the filler neck 22 and admit air from the atmosphere into the interior region during vacuum conditions in the filler neck 22.

A plate 128 is positioned between the cover 124 of top lid 118 and the circular top wall 56 of handle cover 12, as shown best in FIGS. 5 and 9. Plate 128 is configured to couple the top lid 118 to the handle cover 12 so that the core 18 rotates inside sleeve 14 in response to rotation of the handle cover 12 relative to the filler neck 22. Plate 128 includes a bottom 130 having a pair of prongs 132 for extending into a pair of elongated slots 134 formed in top lid 118 so as to lock the top lid 118 to the plate 128 for rotation therewith. The plate 128 also includes a pair of vertical flanges 136 that are oriented to project into the elongated channel 64 so as to lock the plate 128 to the handle cover 12 for rotation therewith. Also, an upstanding fastener 138 is appended to a central region of the round breakaway top lid cover 124 and oriented to extend into an aperture 140 formed in plate 128 to lock top lid 118 (and core 18) to the plate 128 for rotation therewith.

Figure 10:
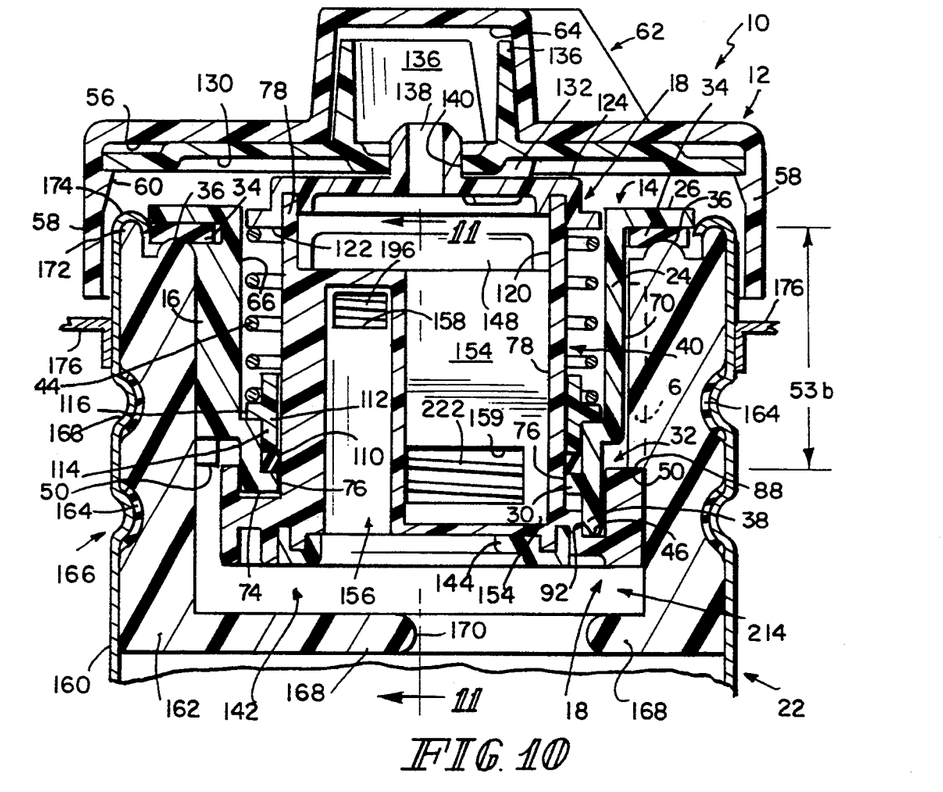
FIG. 10 is a view similar to FIG. 9 showing the quick-on cap in the filler neck after the handle cover has been rotated one-eighth of a revolution to cause the sleeve to move further into the filler neck to compress the sealing ring between the top flange of the sleeve and an annular rim at the mouth of the filler neck.
Figure 15:
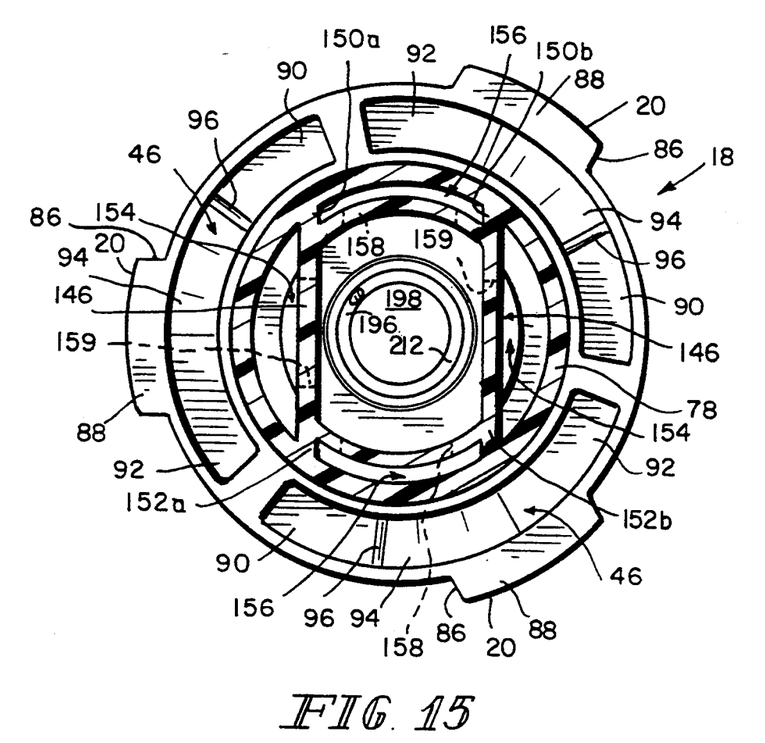
FIG. 15 is a section taken along lines 15—15 of FIG. 5 through the core showing three radially outwardly extending, circumferentially spaced-apart retaining lugs and three cylindrical cams arranged in series around a tubular member and configured to engage three corresponding cam followers appended to the sleeve.

As shown in FIGS. 5, 9, and 10, a pressure-vacuum-relief assembly 142 is coupled to core 18 and mounted in the interior region of the tubular body 78 to control flow of fuel vapor out of the filler neck 22 and atmospheric air into the filler neck 22. The assembly 142 includes an annular base 144 coupled to the lower end of the tubular body 78, an upstanding hollow body 146, and a top cap 148. As shown in FIG. 5 and 15, core 18 includes axially extending portions 150a, b and 152a, b that engage tubular body 78 and the hollow body 146 to divide the space therebetween into two spaced-apart fuel vapor discharge passageways 154 and two spaced-apart atmospheric air intake passageways 156. The hollow body 146 includes a first pair of slots 158 that provide upper vent openings in air intake passageways 156 shown in FIG. 11 and a second pair of slots 159 that provide lower vent openings in fuel vapor discharge passageways 154. A more detailed description of the operation of the pressure-vacuum-relief assembly 142 will be provided below with reference to FIGS. 11 and 12.

Figure 8:
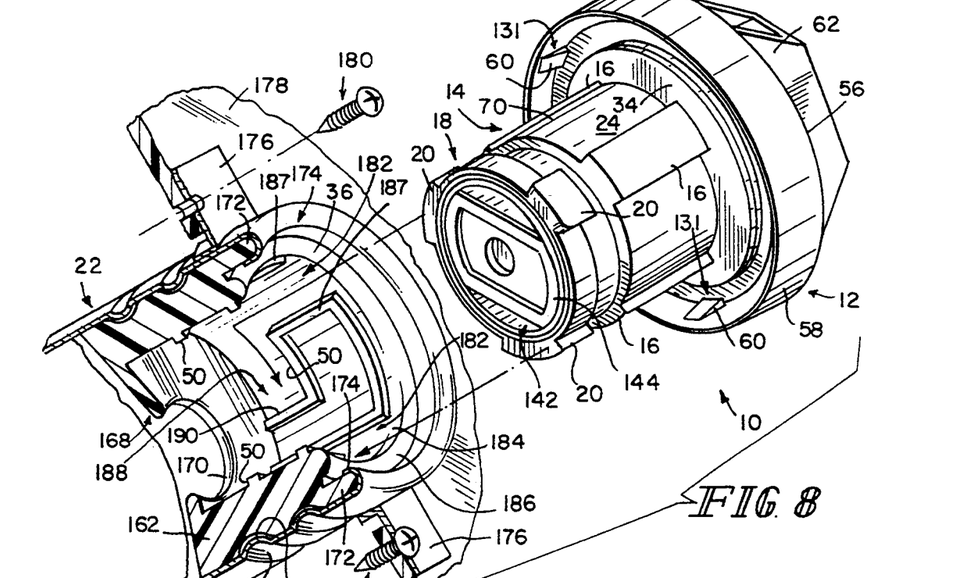
FIG. 8 is a perspective view of the quick-on cap of FIG. 5 as it is about to be inserted into a filler neck provided with various internal flanges.

Filler neck 22 is shown in more detail in FIG. 8. Filler neck 22 illustratively includes a sheet metal fill tube 160 and a molded plastic insert 162. Insert 162 includes external threads 164 for threadedly engaging the threaded outer end 166 of fill tube 160. A partition wall 168 is formed in insert 162 to include an aperture 170 sized to receive an unleaded fuel-dispensing nozzle (not shown) of the type used to pump fuel into a filler neck. Insert 162 also includes an annular outer lip 172 and the distal end 174 of fill tube 160 is deformed as shown in FIG. 8 to embrace the annular outer lip 172 and hold the insert 162 in place in fill tube 160 as shown in FIG. 8. Exterior mounting flanges 176 are appended to fill tube 160 to permit filler neck 22 to be mounted to vehicle 178 easily using fasteners 180.

As shown in FIG. 8, the interior of filler neck insert 162 is formed to include internal flanges that define slots for receiving and guiding the three retaining lugs 20 that are appended to the core 118. An axially extending slot 182 is provided for receiving each of the three retaining lugs 20 as the quick-on cap 19 is thrust into the cap-receiving aperture 184 defined by the annular sealing ring-receiving seat 186 formed by annular rim 36 in filler neck insert 162. As the cap 10 is inserted into filler neck 22, the three retaining lugs 20 pass out of the three axially extending slots 182 and are held in a position ready to be moved into the circumferentially extending slots 188. However, the three anti-rotation ribs 16 on sleeve 14 are retained in the three axially extending slots 182 and engage the internal flanges 187 defining those slots to block rotation of sleeve 14 in filler neck 22 without inhibiting rotation of core 18 relative to sleeve 14 and filler neck 22.

Once the cap 10 has been inserted into filler neck 22 and moved axially inwardly so that the annular sealing ring 34 is loosely resting on the annular rim 36 of filler neck 22, the cap 10 is in its loosened position and ready to be tightened. A user simply needs to rotate the handle cover 12 about longitudinal axis a fraction of a turn (e.g., one-eighth of a revolution). Rotation of handle cover 12 causes plate 128 and core 18 to rotate relative to the filler neck 22 and the non-rotatable sleeve 14 so that the three retaining lugs 20 appended to core 18 rotate into the three circumferentially extending slots 188 formed in filler neck 22. Once moved into slots 188, the axially outwardly facing anchor face 88 on each retaining lug 20 is positioned to engage the internal flange 50 in filler neck 22 and thereby block removal of cap 10 from filler neck 22.

As the core 18 rotates about its longitudinal axis, the three cylindrical cams 46 on core 18 are rotating to allow spring 44 to be released to urge the sleeve 14 and core 18 in opposite directions so that the three cam followers 38 and sleeve 14 move in an axially inward direction. In effect, spring 44 (through outer lid 118, tubular member 78, ring 80, and retaining lugs 20) pushes against internal flange 50 of filler neck 22 as shown in FIG. 10 to move sleeve 14 in the axially inward direction. It will be understood that the three anti-rotation ribs 16 appended to sleeve 14 and lying in the three axially extending slots 182 are free to move axially in said axially extending slots 182 even though they engage internal flanges 187 to block rotation of the sleeve 14 in filler neck 22. Therefore, the three cams 46 on core 18 operate to allow the spring 44, which is always applying an axially inwardly directed load to the sleeve 14 through the squeeze collar 112, to move the sleeve 14 further in the axially inward direction into filler neck 22. This will cause the main annular sealing ring 34 that is carried on the annular top flange 26 of sleeve 14 to be compressed between the annular top flange 26 and the annular seat 186 on annular rim 36 to establish a tight fuel vapor seal therebetween without scuffing the main annular sealing ring 34.

The sealing ring 34 is moved axially into engagement with the annular seat 186 on the filler neck insert 162 by the annular top flange 26 of sleeve 14. This allows the sealing ring 34 to be moved gently against the annular seat 186 in such a way as to avoid the time of scuffing that usually happens to O-rings that are rotated into frictional engagement with a filler neck. As a result, it is possible to form sealing 34 out of a more pliant material which provides a better fuel vapor seal between the cap 10 and filler neck 22. Advantageously, a compliant sealing ring 34 is able to establish a tight fuel vapor seal against a filler neck even though the filler neck may suffer from dimensional irregularities, nicks caused by banging with fuel-dispensing nozzles during refueling or other external or internal damage or flaws.

Of course, the spring 44 also applies a load to the squeeze collar 112 and the second sealing ring 110 to establish a fuel vapor seal between the sleeve 14 and core 18. Venting of fuel vapor from filler neck 22 to the atmosphere and admission of ambient air into the filler neck 22 while the cap 10 is mounted on the filler neck 22 is controlled by the pressure-vacuum-relief assembly 142 mounted inside the tubular member 78 of core 18.

Referring to FIG. 9, it will be understood that the cap 10 is designed to allow the handle cover 12 and/or plate 128 to break away or separate from the rest of the cap 10 without breaking the closure seal between the cap 10 and filler neck 22 during an accidental impact to handle cover 12. A first breakaway connection 129 is provided by engagement of plate 128 and the breakaway fasteners 138 provided on top lid cover 124. During an impact to handle cover 12, the breakaway fasteners 138 in aperture 140 of plate 128 can disengage plate 128 to allow closure handle 12 and plate 128 to separate from top lid cover 124 without disturbing the filler neck closure established by sleeve 14, sealing ring 34, core 18, and sealing ring 114. Also, a second breakaway connection 131 is provided by engagement of plate 128 and the radially inwardly projecting snap connection lugs 60 shown in FIGS. 8 and 9. During an impact to handle cover 12, the snap connection lugs can buckle or move to disengage the periphery of plate 128 to allow closure handle 12 to separate from the rest of cap 10 without opening the mouth of filler neck 22.

Figure 11:
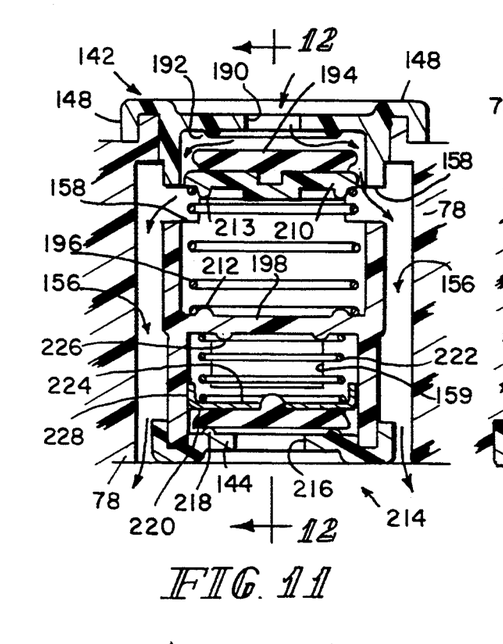
FIG. 11 is a section taken along lines 11—11 of FIG. 10 showing the opening of a vacuum-relief valve positioned inside the core to admit air from the atmosphere into the filler neck through the mounted quick-on cap.

The vacuum-relief mechanism provided in the quick-on cap 10 is illustrated best in FIG. 11. Top cap 148 is formed to include an air inlet aperture 190 and an axially inwardly facing annular valve seat 192 around the air inlet aperture 190. Valve seat 192 is located between the air inlet aperture 190 and the pair of upper vent openings 158 and arranged to engage a vacuum-relief valve 194. A spring 196 is provided inside hollow body 146 to engage partition 198 and normally urge a valve support member 210 and the vacuum-relief valve 194 mounted on valve support member 210 into sealing engagement with the annular valve seat 192 to close the air inlet aperture 190. An axially outwardly facing annular rim 212 is appended to partition 198 to stabilize the bottom end of the spring 196 as shown in FIG. 11. Another annular rim 213 is appended to the underside of valve support member 210 to stabilize the top end of spring 196.

The vacuum-relief valve 194 is moved against the bias provided by spring 196 whenever the cap 10 is in place on the filler neck 22 and the pressure in the filler neck 22 around the cap 10 falls below a predetermined threshold level. For example, a negative pressure could occur in filler neck 22 overnight during vehicle cool-down caused by low atmospheric temperatures. Low pressures in region 214 in filler neck 22 operate to apply a force to move the vacuum-relief valve 194 away from annular valve seat 192 and against the spring 192. This opens the air inlet aperture 190 so that ambient air can flow from the atmosphere through air inlet aperture 190 into the two atmospheric air intake passageways 156 and on into the interior region 214 of the filler neck 22. A preferred location of the two spaced-apart axially extending air intake passageways 156 is illustrated in FIGS. 11 and 15. Such an air flow will be sufficient to cure any vacuum problems that may develop in the filler neck 22. Once the pressure in the filler neck 22 returns to normal, the spring 196 returns the vacuum-relief valve 194 to its closed position (not shown) against the annular valve seat 192. It will be understood that the vacuum-relief system functions independently of and separate from the pressure-relief system.

Figure 12:
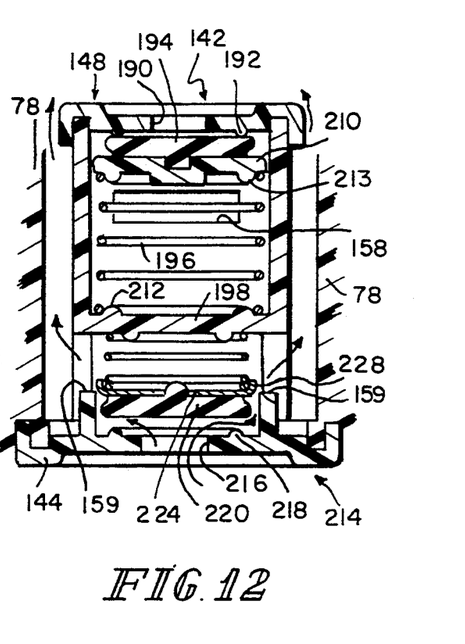
FIG. 12 is a section taken along lines 12—12 of FIG. 11 showing the opening of a pressure-relief valve positioned underneath the vacuum-relief valve to vent pressurized fuel vapor from the filler neck to the atmosphere through the mounted quick-on cap.
Figure 13:
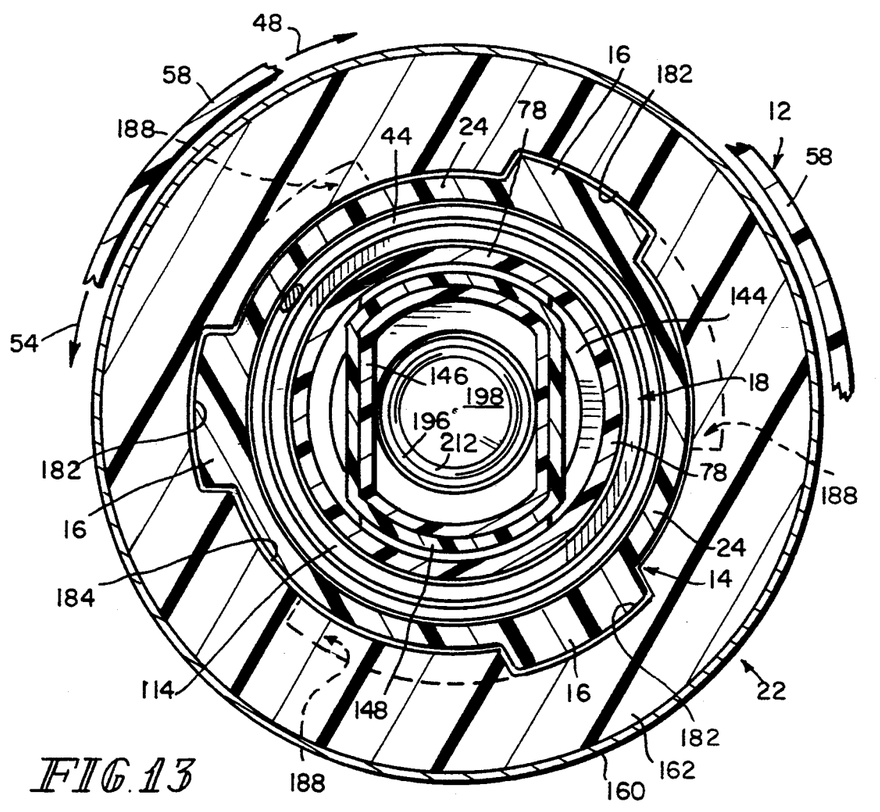
FIG. 13 is a section taken along lines 13—13 of FIG. 9 showing the cap in the position illustrated diagrammatically in FIG. 2.
Figure 14:
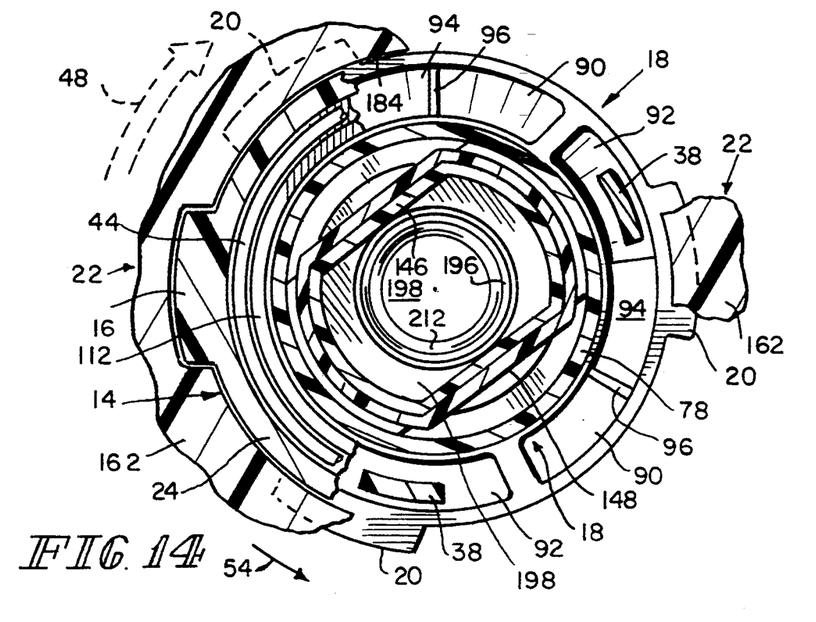
FIG. 14 is a view similar to FIG. 13 after the handle cover and core have been rotated one-eighth of a revolution in a clockwise direction relative to the sleeve and the filler neck to the position shown in FIGS. 4 and 10.

The pressure-relief mechanism provided in the quick-on cap 10 is illustrated best in FIG. 12. Annular base 144 is formed to include a fuel vapor vent aperture 216 and an axially outwardly facing annular valve seat 218 around the fuel vapor vent aperture 216. The valve seat 218 is located between the fuel vapor vent aperture 216 and the pair of lower vent openings 159 and arranged to engage a pressure-relief valve 220. A spring 222 is provided inside hollow body 146 to engage the underside of partition 198. The spring 222 normally urges a valve support member 224 and the pressure-relief valve 220 mounted on the valve support member 224 into sealing engagement with the annular valve seat 218 to close the fuel vapor vent aperture 216. An axially inwardly facing annular rim 226 is appended to the underside of partition 198 to stabilize the top end of spring 222 as shown in FIG. 12. The valve support member 224 includes an annular perimeter rim 228 for stabilizing the bottom end of spring 222 as shown in FIG. 12.

The pressure-relief valve 220 is moved against the bias provided by spring 222 whenever the cap 10 is in place in the filler neck 22 and the pressure in the filler neck 22 around the cap 10 rises above a predetermined threshold level. High pressures in region 214 in filler neck 22 operate to apply a force to move the pressure-relief valve 220 away from annular valve seat 218 and against spring 222. This opens the fuel vapor vent aperture 216 so that pressurized fuel vapor from filler neck 22 can flow through fuel vapor vent aperture 216 into the two fuel vapor discharge passageways 154 and on through the annular space between the annular perimeter side wall 58 of handle cover 12 and the distal end 174 of filler neck 22 to the atmosphere. A preferred location of the two spaced-apart axially extending fuel vapor discharge passageways 154 is illustrated in FIGS. 12 and 15. Once the pressure in the filler neck 22 returns to normal, the spring 22 returns the pressure-relief valve 220 to its closed position (not shown) against the annular valve seat 218.

Although the invention has been described in detail with reference to certain preferred embodiments, variations and modifications exist within the scope and spirit of the invention as described and defined in the following claims.

We claim:

1. A cap engageable with a filler neck having a mouth, the cap comprising means for closing the mouth of the filler neck, the closing means including a core and a sleeve around and adjacent to the core, the sleeve being movable relative to the core and carrying a sealing ring configured to engage the filler neck at its mouth upon insertion of the core in an axially inward direction into the filler neck, and means for gripping the filler neck to compress the sealing ring between the sleeve and the filler neck so that a liquid and fuel vapor seal is established between the closing means and the filler neck in response to movement of the core relative to the sleeve in a cap-installation direction, the gripping means including a gripping portion coupled to the core and a separate grip-actuating portion coupled to the sleeve, the gripping portion including retaining lug means for selectively engaging the filler neck to block removal of the closing means from the filler neck, the grip-actuating portion being positioned to lie between the sealing ring and the retaining lug means and to engage the gripping portion.

2. The cap of claim 1, wherein the core has an axis of rotation extending along a central axis of the filler neck and the closing means further includes a handle cover and means for coupling the handle cover to the core for rotating movement therewith about said axis of rotation so that the core is moved relative to the sleeve in its cap-installation direction in response to rotating movement of the handle cover about said axis of rotation relative to the filler neck.

3. The cap of claim 2, wherein the grip-actuating portion includes a cam follower coupled to the sleeve, the gripping means further includes spring means for yieldably urging the cam follower into engagement with the gripping portion, and the gripping portion further includes means coupled to the core for camming the cam follower in response to movement of the handle cover and core relative to the filler neck to release the sleeve so that the spring means moves the sleeve in an axially inward direction relative to the filler neck to compress the sealing ring between the sleeve and the filler neck.

4. The cap of claim 3, wherein the cam means includes at least one cylindrical cam member having an axis of rotation and the handle cover is rotatable in the filler neck about said axis of rotation.

5. The cap of claim 3, wherein a radially outwardly extending flange is appended to the core, the sleeve includes a radially inwardly extending flange lying in axially spaced-apart relation to the radially outwardly extending flange, and the spring means includes a compression spring lying between and acting against the radially outwardly and inwardly extending flanges to urge the cam follower on the sleeve into engagement with the cam on the core.

6. The cap of claim 2, wherein the core includes a cylindrical member having an axially outer end including the coupling means and an axially inner end including the gripping portion.

7. The cap of claim 6, wherein the sleeve is formed to include a passageway extending therethrough and containing the cylindrical member and the sleeve is positioned to lie between the handle cover and the gripping portion.

8. The cap of claim 6, wherein a flange is appended to the axially outer end of the core, the sleeve includes a flange at its axially inner end, said flanges are positioned to lie in axially spaced-apart relation to one another, and the spring means includes a compression spring lying between and acting against said flanges to urge the cam follower on the sleeve into engagement with the cam on the core.

9. The cap of claim 1, wherein the grip-actuating portion includes a cam follower coupled to the sleeve, spring means for yieldably urging the cam follower into engagement with the gripping portion, and the gripping portion includes means for camming the cam follower in response to movement of the core relative to the sleeve in the cap-installation direction to release the sleeve so that the spring means moves the sleeve in an axially inward direction relative to the filler neck to compress the sealing ring between the sleeve and the filler neck.

10. The cap of claim 1, wherein the retaining lug means includes three retaining lugs coupled to the core.

11. The cap of claim 10, wherein the core includes a cylindrical member and the three retaining lugs are appended to the cylindrical member and arranged to lie in circumferentially spaced-apart relation about the cylindrical member.

12. A cap engageable with a filler neck having a mouth, the cap comprising
means for closing the mouth of the filler neck, the closing means including a core and a sleeve around and adjacent to the core, the sleeve being movable relative to the core and carrying a sealing ring configured to engage the filler neck at its mouth upon insertion of the core in an axially inward direction into the filler neck, and
means for gripping the filler neck to compress the sealing ring between the sleeve and the filler neck so that a fuel vapor seal is established between the closing means and the filler neck in response to movement of the core relative to the sleeve in a cap-installation direction, the gripping means including a gripping portion coupled to the core and a separate grip-actuating portion coupled to the sleeve, the core including a cylindrical member, and the sleeve being formed to include a passageway extending therethrough and containing the cylindrical member, the gripping portion including retaining lug means for selectively engaging the filler neck to block removal of the closing means from the filler neck, the cylindrical member being formed to include a passageway and including a vent valve assembly positioned in the passageway.

13. The cap of claim 12, wherein the grip-actuating portion includes a cam follower coupled to the sleeve, the gripping means further includes spring means for yieldably urging the cam follower into engagement with the gripping portion, and the gripping portion includes means appended to the cylindrical member for camming the cam follower in response to movement of the core relative to the sleeve in the cap-installation direction to release the sleeve so that the spring means moves the sleeve in an axially inward direction relative to the filler neck to compress the sealing ring between the sleeve and the filler neck.

14. The cap of claim 12, wherein the sleeve includes an axially outer end, an axially inner end, a radially outwardly extending annular flange appended to the axially outer end, and means for holding the sealing ring against the annular flange and around the sleeve.

15. The cap of claim 12, wherein the gripping means further includes means on the sleeve for engaging the filler neck to block rotation of the sleeve in the filler neck without inhibiting movement of the sleeve in the axially inward direction relative to the filler neck, the sleeve includes an axially outer end, an axially inner end, and a radially outwardly extending annular flange appended to the axially outer end, and the engaging means is positioned to hold the sealing ring against the annular flange and around the sleeve.

16. The cap of claim 12, wherein the cylindrical member includes an axially outer end and an axially inner end, the retaining lug means anchors the core to the filler neck in response to movement of the core relative to the sleeve in the cap-installation direction, and the retaining lug means is appended to the axially inner end of the cylindrical member.

17. The cap of claim 16, wherein the core further includes a top lid appended to the axially outer end of the cylindrical member, the grip-actuating portion includes a cam follower coupled to the sleeve, the gripping means further including spring means for yieldably urging the cam follower in the axially inward direction into engagement with the core, the spring means engages the top lid and the sleeve, and the gripping portion includes means on the cylindrical member for camming the cam follower in response to movement of the core relative to the sleeve in the cap-installation direction to permit the spring means to move the sleeve in the axially inward direction relative to the filler neck so that the sealing ring is compressed between the sleeve and the filler neck.

18. The cap of claim 12, wherein the vent valve assembly includes a pressure-relief valve.

19. The cap of claim 18, wherein the vent valve assembly further includes a vacuum-relief valve.

20. The cap of claim 12, wherein the vent valve assembly includes a vacuum-relief valve.

21. The cap of claim 12, wherein the gripping means further includes a compression spring arranged around the cylindrical member and positioned to lie in a space between the cylindrical member and the sleeve.

22. A cap engageable with a filler neck having a mouth and an internal flange, the cap comprising means for closing the mouth of the filler neck, the closing means including a core and a sleeve around and adjacent to the core, the sleeve being movable relative to the core and carrying a sealing ring configured to engage the filler neck at its mouth upon insertion of the core in an axially inward direction into the filler neck, and means for gripping the filler neck to compress the sealing ring between the sleeve and the filler neck so that a fuel vapor seal is established between the closing means and the filler neck in response to movement of the core relative to the sleeve in a cap-installation direction, the gripping means including retaining lug means coupled to the core for anchoring the core to the filler neck to establish an anchored position of the core and to block withdrawal of the core from the filler neck, anti-rotation means for engaging the internal flange in the filler neck to permit axial movement of the sleeve into and out of the filler neck upon insertion of the closing means into the filler neck to engage the sealing ring and the filler neck, and a spring acting between the core and sleeve and yieldably urging the core and sleeve in opposite directions and moving the sleeve further into the filler neck relative to the filler neck while the core is in its anchored position and the anti-rotation means engages the internal flange in the filler neck so that the sealing ring is compressed between the sleeve and the filler neck.

23. The cap of claim 22, wherein the retaining lug means engages an internal flange in the filler neck to block withdrawal of the core from the filler neck in response to rotation of the core relative to the filler neck.

24. The cap of claim 23, wherein the closing means further includes a handle cover and means for coupling the handle cover to the core for movement therewith so that the core is moved relative to the sleeve in its cap-installation direction and the retaining lug means is moved to engage the internal flange in response to rotation of the handle cover relative to the filler neck in the cap-installation direction.

25. The cap of claim 22, wherein the retaining lug means includes a plurality of retaining lugs appended to the core and further comprising means for rotating the core relative to the sleeve to move the retaining lugs inside the filler neck from an unlocked position disengaging an internal flange in the filler neck to a locked position engaging the internal flange and blocking withdrawal of the core from the filler neck.

26. The cap of claim 25, wherein the rotating means includes means for blocking rotation of the sleeve in the filler neck, a handle cover, and means for coupling the core to the handle cover for rotation therewith so that the core is rotatable relative to the sleeve upon rotation of the handle cover relative to the filler neck.

27. The cap of claim 22, wherein a radially outwardly extending flange is appended to the core, the sleeve includes a radially inwardly extending flange lying in axially spaced-apart relation to the radially outwardly extending flange, and the spring is a compression spring positioned between the radially outwardly and inwardly extending flanges.

28. The cap of claim 27, further comprising means for establishing a fuel vapor seal between the core and the sleeve and wherein the establishing means includes a second sealing ring engaging the core and the sleeve and means for using the compression spring to compress the second sealing ring between the core and the sleeve.

29. The cap of claim 22, further comprising means for establishing a fuel vapor seal between the core and the sleeve and wherein the establishing means includes a second sealing ring engaging the core and the sleeve and means for using the spring to compress the second sealing ring between the core and the sleeve.

30. The cap of claim 22, wherein the sleeve is formed to include a passageway extending therethrough and containing the core member therein, the sleeve and core cooperate to define an annular space around the core and between the core and the sleeve, and the spring is a coiled compression spring positioned in the annular space.

31. The cap of claim 30, further comprising means for establishing a fuel vapor seal between the core and the sleeve and wherein the establishing means includes a second sealing ring engaging the core and the sleeve and means for using the compression spring to compress the second sealing ring between the core and the sleeve.

32. The cap of claim 30, wherein a radially outwardly extending annular flange is appended to the core and arranged to extend toward the sleeve to provide a ceiling covering the annular space, the sleeve includes a radially inwardly extending annular flange extending toward the core to provide a floor underlying the annular space, and the coiled compression spring is arranged in the annular space to act against the radially outwardly and inwardly extending annular flanges.

33. A cap engageable with a filler neck having a mouth and an internal flange, the cap comprising means for closing the mouth of the filler neck, the closing means including a core and a sleeve around and adjacent to the core, the sleeve being movable relative to the core and carrying a sealing ring configured to engage the filler neck at its mouth upon insertion of the core in an axially inward direction into the filler neck, and means for gripping the filler neck to compress the sealing ring between the sleeve and the filler neck so that a fuel vapor seal is established between the closing means and the filler neck in response to movement of the core relative to the sleeve in a cap-installation direction, the gripping means including retaining lug means coupled to the core for anchoring the core to the filler neck to establish an anchored position of the core and to block withdrawal of the core from the filler neck, anti-rotation means for engaging the internal flange in the filler neck to permit axial movement of the sleeve into and out of the filler neck upon insertion of the closing means into the filler neck to engage the sealing ring and the filler neck, and spring means for yieldably urging the core and sleeve in opposite directions to move the sleeve further into the filler neck relative to the filler neck while the core is in its anchored position and the anti-rotation means engages the internal flange in the filler neck so that the sealing ring is compressed between the sleeve and the filler neck, the core including a cylindrical member having an axially outer end and an axially inner end, the sleeve being formed to include a passageway extending therethrough and containing the cylindrical member, the gripping means further including a ring member appended to the axially inner end of the cylindrical member and arranged to surround the axially inner end of the cylindrical member, and the retaining lug means including at least one retaining lug appended to the ring member and configured to engage a radially inwardly extending flange in the filler neck upon rotation of the core relative to the filler neck.

34. A cap engageable with a filler neck having a mouth, the cap comprising means for closing the mouth of the filler neck, the closing means including a core and a sleeve adjacent to the core, the sleeve being movable relative to the core and carrying a sealing ring configured to engage the filler neck at its mouth upon insertion of the core in an axially inward direction into the filler neck, and means for gripping the filler neck to compress the sealing ring between the sleeve and the filler neck so that a fuel vapor seal is established between the closing means and the filler neck in response to movement of the core relative to the sleeve in a cap-installation direction, the gripping means including means coupled to the core for anchoring the core to the filler neck to establish an anchored position of the core and to block withdrawal of the core from the filler neck and spring means for yieldably urging the core and sleeve in opposite directions to move the sleeve further into the filler neck relative to the filler neck while the core is in its anchored position so that the sealing ring is compressed between the sleeve and the filler neck, the core including a cylindrical member having an axially outer end and an axially inner end, the sleeve being formed to include a passageway extending therethrough and containing the cylindrical member, the gripping means further including a ring member appended to the axially inner end of the cylindrical member and arranged to surround the axially inner end of the cylindrical member, the anchoring means including at least one retaining lug appended to the ring member and configured to engage a radially inwardly extending flange in the filler neck upon rotation of the core relative to the filler neck, the gripping means further including a cam follower appended to the sleeve and a cam appended to the ring member to lie between the at least one retaining lug and the cylindrical member, the spring means being coupled to the sleeve and to a radially outwardly extending flange coupled to the axially outer end of the cylindrical member to urge the cam follower into engagement with the cam, and the cam defining means for camming the cam follower in response to rotation of the core relative to the filler neck to move the at least one retaining lug into engagement with the radially inwardly extending flange on the filler neck to release the sleeve so that the spring means moves the sleeve in an axially inward direction relative to the filler neck to compress the sealing ring between the sleeve and the filler neck.

35. The cap of claim 34, wherein the cam is cylindrical.

36. A cap rotatably engageable with a filler neck having a mouth and an internal flange, the cap comprising means for closing the mouth of the filler neck, the closing means including a core having a retaining lug and a cam member, a sleeve sealingly engaging the core, the sleeve including a cam follower engaging the cam member, a sealing ring configured to engage the filler neck at its mouth, and anti-rotation means for engaging the internal flange in the filler neck to permit axial movement of the sleeve into and out of the filler neck and to block rotation of the sleeve relative to the filler neck upon insertion of the closing means into the filler neck to engage the sealing ring and the filler neck, and spring means for yieldably biasing the sleeve to urge the sealing ring against the filler neck and the cam follower in a first direction into the filler neck and against the cam member, and means for rotating the core relative to the sleeve once the anti-rotation means of the sleeve is coupled to the internal flange in the filler neck to move the retaining lug on the core into locking engagement with the internal flange of the filler neck and to move the cam member relative to the cam follower to allow the spring means to urge the cam follower downwardly in said first direction into the filler neck so that withdrawal of the closing means from the filler neck is blocked by engagement of the retaining lug and the internal flange and the spring means is allowed to expand and move the sealing ring further against the filler neck to establish a fuel vapor seal between the closing means and the filler neck.

37. The cap of claim 36, wherein the core includes a tubular member, the sleeve includes an annular portion around the tubular member, and the spring means includes a compression spring arranged around the tubular member and positioned to lie in a space between the tubular member and the annular portion.

38. The cap of claim 37, further comprising a pressure-relief valve in the tubular member.

39. The cap of claim 37, further comprising a vacuum-relief valve in the tubular member.

40. The cap of claim 37, wherein the tubular portion includes an axially outer end and an axially inner end, the retaining lug is appended to the axially inner end, the core further includes a top lid appended to the axially outer end, and the spring acts against the top lid to urge the sleeve in said first direction.

41. The cap of claim 40, wherein the rotating means includes a handle cover and the top lid includes means for engaging the handle cover to rotate therewith.

42. The cap of claim 40, wherein the cam member is appended to the axially inner end of the tubular member, the annular portion includes an inner end and an outer end, the cam follower is appended to the inner end of the annular portion and arranged to engage the cam member, and the sealing ring is appended to the outer end of the annular portion.

43. The cap of claim 40, further comprising a second sealing ring lying in the space between the tubular member and the annular portion and an annular ring lying in the space between the tubular member and the annular portion, and wherein the spring includes a top end acting against the top lid and a bottom end applying a force to the annular ring to urge the annular ring against the second sealing ring and compress the second sealing ring against the tubular member and the annular portion.

44. The cap of claim 36, wherein the cam member is a cylindrical cam.

45. The cap of claim 36, wherein the rotating means includes a handle cover and means for coupling the core to the handle cover for rotation therewith so that the core is rotated within the filler neck in response to rotation of the handle cover relative to the filler neck.

46. The cap of claim 45, wherein the cam member is a cylindrical cam having an axis of rotation and the handle cover is rotatable in the filler neck about said axis of rotation.

47. The cap of claim 45, wherein the sleeve is formed to include a passageway extending therethrough and containing the core and the sleeve is positioned to lie between the handle cover and the retaining lug.

48. The cap of claim 36, wherein the sleeve includes an annular flange and the anti-rotation means cooperates with the annular flange to define means for holding the sealing ring against the annular flange and around the sleeve so that it is supported to engage and seal against the filler neck to establish the fuel vapor seal between the closing means and the filler neck.

49. A cap engageable with a filler neck having a mouth and a flange portion disposed axially inwardly from said mouth internally in said neck, the cap comprising means for closing the mouth of the filler neck, the closing means including a core insertable into said neck, and a sleeve about at least an axially outer portion of the core, the sleeve being axially movable relative to the core and carrying a sealing ring configured to engage the filler neck at its mouth upon insertion of the core and the sleeve in an axially inward direction into the filler neck, and means for gripping the flange portion in the filler neck to compress the sealing ring between the sleeve and the filler neck mouth so that a fuel vapor seal is established between the closing means and the filler neck in response to rotational movement of the core relative to the sleeve in a cap-installation direction, the gripping means including a cam follower appended to the sleeve, a cam appended to the core, retaining lug means appended to the core for selectively engaging the filler neck to block removal of the closing means from the filler neck, and spring means for yieldably urging the cam follower into engagement with the cam, and the cam includes means for camming the cam follower in response to rotational movement of the core relative to the filler neck to release the sleeve so that the spring means moves the sleeve in an axially inward direction relative to the filler neck to compress the sealing ring between the sleeve and the filler neck.

50. A cap engageable with a filler neck having a mouth and a flange portion disposed axially inwardly from said mouth internally in said neck, said flange portion including radially inwardly extending abutments, the cap comprising means for closing the mouth of the filler neck, the closing means including a core insertable into said neck, and a sleeve about at least an axially outer portion of the core, the sleeve being axially movable relative to the core and carrying a sealing ring configured to engage the filler neck at its mouth upon insertion of the core and the sleeve in an axially inward direction into the filler neck, and means for gripping the flange portion in the filler neck to compress the sealing ring between the sleeve and the filler neck mouth so that a fuel vapor seal is established between the closing means and the filler neck in response to rotational movement of the core relative to the sleeve in a cap-installation direction after the core and sleeve are inserted in said neck, said gripping means including first engaging means disposed on said sleeve for engaging said filler neck abutments to prevent rotation of said sleeve in said filler neck and second engaging means for engaging said filler neck abutments when said core is moved rotationally relative to said sleeve to prevent axial outward movement of said cap from said neck, the second engaging means being disposed on said core, a spring acting between the core and the sleeve and yieldably urging said sleeve axially inwardly in response to rotational movement of said core relative to said sleeve, and control means for unloading said spring to cause expansion of the spring in response to rotational movement of the core relative to the sleeve in the cap-installation direction and for loading said spring to cause contraction of the spring in response to rotational movement of the core relative to the sleeve in an opposite direction, the control means including a handle cover and means for coupling the core to the handle cover for rotation therewith.

51. A cap engageable with a filler neck having a mouth, the cap comprising a core insertable into said neck, a sleeve about at least an axially outer portion of the core, the sleeve being axially movable relative to the core and carrying a sealing ring configured to engage the filler neck at its mouth upon insertion of the core and the sleeve in an axially inward direction into the filler neck, and means for gripping the filler neck to compress the sealing ring between the sleeve and the filler neck mouth so that a fuel vapor seal is established between the closing means and the filler neck in response to rotational movement of the core relative to the sleeve in a cap-installation direction, the gripping means including first engaging means for engaging said filler neck disposed on said sleeve to prevent rotation of said sleeve in said filler neck and to permit axial movement of said sleeve in said filler neck, second engaging means for engaging said filler neck to prevent axial outward movement of said cap from said filler neck when said core is rotated in the cap-installation direction, the second engaging means being disposed on said core, a spring acting between the core and the sleeve and yieldably urging said sleeve axially inwardly in response to rotational movement of said core in the cap-installation direction, and control means for releasing said spring in response to rotational movement of the core relative to the sleeve in the cap-installation direction and for loading said spring to cause contraction of the spring in response to rotational movement of the core relative to the sleeve in an opposite direction, the control means including a handle cover and means for coupling the core to the handle cover for rotation therewith.

* * * * *

UNITED STATES PATENT AND TRADEMARK OFFICE
CERTIFICATE OF CORRECTION

PATENT NO. : 5,395,004
DATED : March 7, 1995
INVENTOR(S) : Jeffrey Griffin, et. al.

It is certified that error appears in the above-indentified patent and that said Letters Patent is hereby corrected as shown below:

Title page, item [73] Assignee: should read --Stant Manufacturing Inc.--

Signed and Sealed this

First Day of August, 1995

Attest:

BRUCE LEHMAN

Attesting Officer

Commissioner of Patents and Trademarks